United States Patent
Xu et al.

(10) Patent No.: US 12,087,957 B2
(45) Date of Patent: Sep. 10, 2024

(54) BATTERY, APPARATUS USING BATTERY, AND PREPARATION METHOD AND PREPARATION DEVICE OF BATTERY

(71) Applicant: CONTEMPORARY AMPEREX TECHNOLOGY CO., LIMITED, Ningde (CN)

(72) Inventors: Xiaofu Xu, Ningde (CN); Yonghuang Ye, Ningde (CN); Haizu Jin, Ningde (CN); Chengdu Liang, Ningde (CN); Qian Liu, Ningde (CN); Xia Hu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 64 days.

(21) Appl. No.: 17/988,242

(22) Filed: Nov. 16, 2022

(65) Prior Publication Data
US 2023/0071423 A1    Mar. 9, 2023

Related U.S. Application Data

(63) Continuation of application No. PCT/CN2020/129474, filed on Nov. 17, 2020.

(51) Int. Cl.
*H01M 50/242* (2021.01)
*H01M 10/613* (2014.01)
*H01M 10/6556* (2014.01)
*H01M 50/103* (2021.01)
(Continued)

(52) U.S. Cl.
CPC ....... *H01M 50/242* (2021.01); *H01M 10/613* (2015.04); *H01M 10/6556* (2015.04); *H01M 50/103* (2021.01); *H01M 50/209* (2021.01); *H01M 50/291* (2021.01); *H01M 2220/20* (2013.01)

(58) Field of Classification Search
CPC .......... H01M 10/613; H01M 10/6556; H01M 2220/20; H01M 50/242; H01M 50/103; H01M 50/209; H01M 50/291; H01M 50/20; H01M 50/202; H01M 50/244; Y02E 60/10
See application file for complete search history.

(56) References Cited

U.S. PATENT DOCUMENTS

2011/0104543 A1    5/2011    Kim et al.
2011/0177372 A1    7/2011    Maguire et al.
(Continued)

FOREIGN PATENT DOCUMENTS

CN    207250612 U    4/2018
CN    109148754 A    1/2019
(Continued)

OTHER PUBLICATIONS

English Translation of CN210403848.*
(Continued)

*Primary Examiner* — Kiran Quraishi Akhtar
(74) *Attorney, Agent, or Firm* — Anova Law Group, PLLC

(57) ABSTRACT

A battery includes a plurality of battery cells and a support member configured to support the plurality of battery cells. The support member includes a recess. One battery cell of the battery cells extends into and is supported in the recess.

13 Claims, 10 Drawing Sheets

(51) Int. Cl.
*H01M 50/209* (2021.01)
*H01M 50/291* (2021.01)

(56) References Cited

U.S. PATENT DOCUMENTS

| | | | | |
|---|---|---|---|---|
| 2015/0357688 A1* | 12/2015 | Heeg | ............ | H01M 10/625 |
| | | | | 165/80.4 |
| 2019/0006644 A1 | 1/2019 | Sakurai | | |
| 2020/0006827 A1 | 1/2020 | Filter et al. | | |
| 2020/0036063 A1 | 1/2020 | Hirsch et al. | | |
| 2020/0274131 A1 | 8/2020 | Chen et al. | | |

FOREIGN PATENT DOCUMENTS

| | | | | | |
|---|---|---|---|---|---|
| CN | 109428019 | A | | 3/2019 | |
| CN | 208674305 | U | | 3/2019 | |
| CN | 109830627 | A | | 5/2019 | |
| CN | 210403848 | | * | 4/2020 | ......... H01M 2/10 |
| CN | 210403848 | U | | 4/2020 | |
| CN | 210429900 | | * | 4/2020 | ......... H01M 10/613 |
| CN | 210429900 | U | | 4/2020 | |
| IN | 102623739 | A | | 8/2012 | |
| JP | 2012022937 | A | | 2/2012 | |
| JP | 2019050170 | A | | 3/2019 | |

OTHER PUBLICATIONS

English Translation of CN210429900.*
The World Intellectual Property Organization (WIPO) International Search Report and Written Opinion for No. PCT/CN2020/129474, Jul. 26, 2021 17 pages (including English translation).
The European Patent Office (EPO) Extended Search Report for EP Application No. 20961837.0 Jul. 24, 2023 8 Pages.
China National Intellectual Property Administration (CNIPA) Office Action 1 for Application No. 202080102557.X Jun. 19, 2024, 14 Pages (including translation).

* cited by examiner

BATTERY, APPARATUS USING BATTERY, AND PREPARATION METHOD AND PREPARATION DEVICE OF BATTERY

CROSS-REFERENCE TO RELATED APPLICATION

This application is a continuation of International Application No. PCT/CN2020/129474, filed Nov. 17, 2020, the entire content of which is incorporated herein by reference.

TECHNICAL FIELD

This application relates to the technical field of batteries, and in particular, to a battery, an apparatus using a battery, and a preparation method and a preparation device of battery.

BACKGROUND

Apparatuses such as automobiles, electric bicycles, ships, and energy storage cabinets include batteries. The batteries provide electric energy for the apparatuses.

A battery includes a plurality of battery cells and a box body. The plurality of battery cells are arranged in sequence, and the box body surrounds the outside of the plurality of battery cells to protect the plurality of battery cells. The box body is provided with positive and negative electrodes, and each battery cell is connected to the positive and negative electrodes. When the battery is working, a load is electrically connected to the positive and negative electrodes, so that the battery provides electric energy for the load.

However, when the battery is working, the battery cell may swell, and the swelling battery cell may press the adjacent battery cell. When the plurality of battery cells are pressed against each other, problems such as displacement of the battery cells and deformation of the box body may be caused, leading to a relatively low safety performance of the battery.

SUMMARY

In view of the foregoing problem, embodiments of this application provide a battery, an apparatus using a battery, and a preparation method and a preparation device of battery, to achieve a relatively high safety performance of the battery.

In order to achieve the foregoing objective, the embodiments of this application provide the following technical solutions:

A first aspect of the embodiments of this application provides a battery. The battery includes: a plurality of battery cells; and a support member, where the support member is configured to support the plurality of battery cells, a recess is provided at the support member, and a part of the battery cells extend into and are supported in the recess.

In some optional implementations, the battery cell includes a bottom wall and a side wall, where the side wall is connected to the bottom wall, and the recess is attached to the bottom wall and the side wall of the battery cell to support the battery cells.

In some optional implementations, centers of at least two battery cells are staggered.

In some optional implementations, the support member has a hollow cavity.

In some optional implementations, an elastic member is provided at the support member, and the elastic member is connected to the support member to support the battery cells.

In some optional implementations, an accommodating groove is provided at the support member, and the elastic member is disposed in the accommodating groove.

In some optional implementations, a flow channel is provided at the support member, and the flow channel is configured to accommodate fluid to regulate temperature of the plurality of battery cells.

Compared with the conventional technology, the battery provided in the embodiments of this application has the following advantages: the battery includes the plurality of battery cells and the support member, and the recess is provided at the support member, so that a part of the battery cells can be supported in the recess. In this way, the plurality of battery cells includes at least two battery cells with centers staggered. When the battery is working, the battery cells swell, and central portions of the battery cells swell and deform most. In this embodiment of this application, the at least two battery cells with centers staggered are provided, so that accumulative swelling deformation of the battery in the same direction becomes smaller, and an internal stress of each battery cell can be released in a plurality of directions, not in the same direction, thereby implementing relatively high safety performance of the battery.

A second aspect of the embodiments of this application provides an apparatus using a battery. The apparatus includes the battery described in the first aspect, and the battery provides electric energy for the apparatus.

A third aspect of the embodiments of this application provides a preparation method of battery, used for preparing the battery described in the first aspect, where the method includes: providing a plurality of battery cells; providing a support member, and forming a recess on the support member; supporting the plurality of battery cells on the support member, and supporting a part of the plurality of battery cells in the recess.

A fourth aspect of the embodiments of this application provides a preparation device of battery, configured to prepare the battery described in the first aspect, where the device includes: a battery cell preparation module, configured to prepare the plurality of battery cells; a support member preparation module, configured to prepare the support member and form a recess on the support member; and an assembling module, configured to support the plurality of battery cells on the support member, and support a part of the battery cells in the recess.

BRIEF DESCRIPTION OF DRAWINGS

To describe the technical solutions in the embodiments of this application more clearly, the following briefly describes the accompanying drawings for describing the embodiments of this application. Apparently, the accompanying drawings in the following description show merely some embodiments of this application, and a person of ordinary skill in the art may still derive other drawings from the accompanying drawings without creative efforts.

Figure 1:
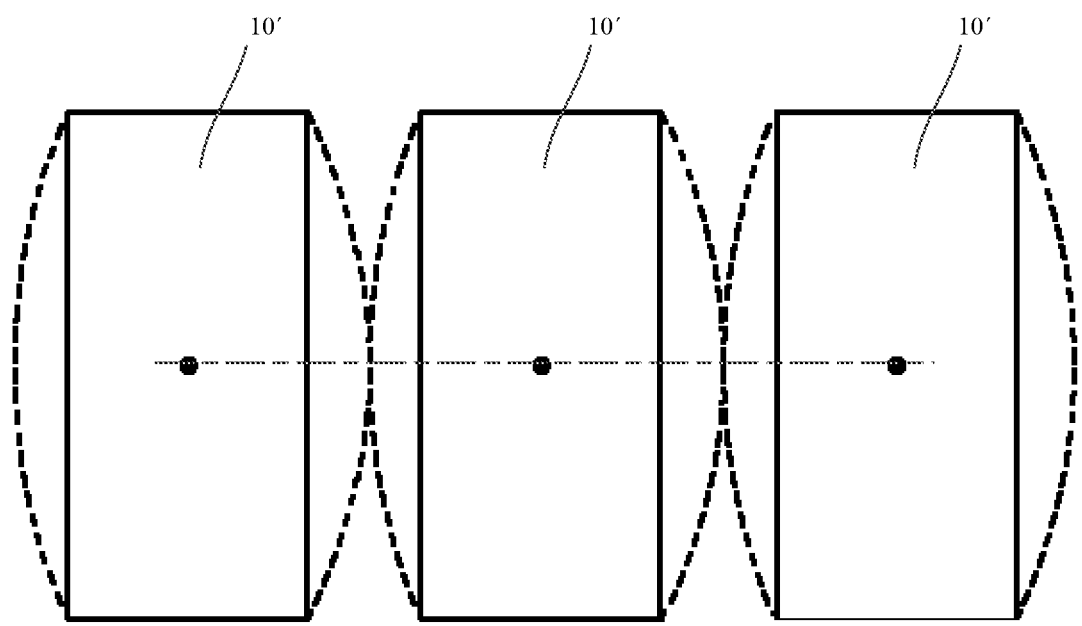
FIG. 1 is a schematic structural diagram showing swelling battery cells.

In the accompanying drawings, the figures are not necessary drawn to scale.

REFERENCE NUMERALS

1: battery;
10: battery cell; 11: bottom wall; 12: side wall; 101: first battery cell; 102: second battery cell; $D_1$: center of first battery cell; $D_2$: center of second battery cell; 13: electrode assembly; 131: positive tab; 132: negative tab; 14: positive electrode terminal; 15: negative electrode terminal; 16: housing;
20: support member; 21: recess; 22: hollow cavity; 23: protruding portion;
30: elastic member;
40: protective box; 41: side plate;
50: vehicle; 51: drive mechanism; 52: control mechanism
X: arrangement direction; Y: width direction; Z: height direction.

DETAILED DESCRIPTION OF EMBODIMENTS

The following further describes the embodiments of this application in detail with reference to the accompanying drawings and implementations. The detailed description and accompanying drawings of the following embodiments are used to illustrate the principle of this application, but are not intended to limit the scope of this application, meaning that this application is not limited to the described embodiments.

In the descriptions of this application, it should be noted that, unless otherwise stated, "plurality" means two or more; and the orientations or positional relationships indicated by the terms "upper", "lower", "left", "right", "inside", "outside", and the like are merely intended to help the descriptions of this application and simplify the descriptions other than indicate or imply that the apparatuses or components must have specific orientations, or be constructed and manipulated with specific orientations, and therefore shall not be construed as limitations on this application. In addition, the terms such as "first", "second", and "third" are merely intended for a purpose of description, and shall not be understood as an indication or implication of relative importance. "Vertical" means being vertical with an allowable range of error but does not necessarily require being strictly vertical. "Parallel" means being parallel with an allowable range of error but does not necessarily require being strictly parallel.

The orientation terms appearing in the following description all indicate directions shown in the figures, and do not limit the specific structure of the application. In the descriptions of this application, it should be further noted that unless otherwise specified and defined explicitly, the terms "install", "link", and "connection" should be understood in their general senses. For example, the terms may be a fixed connection, a detachable connection, or an integrated connection, or may be a direct connection, or an indirect connection through an intermediate medium. A person of ordinary skill in the art can understand specific meanings of these terms in this application as appropriate to specific situations.

FIG. 1 is a schematic structural diagram showing swelling battery cells. Referring to FIG. 1, a battery includes a plurality of battery cells 10'. When the battery cells 10' are working, and an SOC (State Of Charge, a percentage of a remaining capacity of the battery cell in a rated capacity) value of the battery cells 10' reaches a preset range, for example, 20% to 80%, each battery cell 10' may swell due to gas generation of the battery cell 10', thickness change of an electrode plate, lattice shrinkage of a graphite negative electrode, or other reasons, and a central portion of the battery cell 10' has swelled deformed most. Specifically, the battery cell 10' has two side surfaces in a thickness direction, central portions of the two side surfaces protrude toward two sides, respectively. A portion farther away from the center on the side surface protrudes less, meaning that the portion of the battery cell 10' has a smaller swelling deformation. In this way, after a plurality of battery cells 10' are arranged side by side, two adjacent battery cells 10' are arranged along the thickness direction, and the most swelling portions of the two battery cells 10' press against each other, which easily causes the battery cells 10' to be displaced. In the arrangement direction (that is, the thickness direction) of the plurality of battery cells 10', swelling deformation of all the battery cells 10' add up to cause a relatively large accumulative deformation for the battery, which may deform a box body of the battery, leading to poorer safety performance of the battery.

In view of this, the battery provided in this embodiment of this application includes a support member that supports a plurality of battery cells. A recess is provided at the support member, and a part of the battery cells may extend into and be supported in the recess, and the rest battery cells are directly supported by the support member. In this way, the most swelling portions of the two parts of battery cells are staggered, so that the accumulative deformation of the battery in an arrangement direction of the plurality of battery cells is relatively small, achieving a relatively high safety performance of the battery. In addition, in a case that the battery cell cannot further swell due to stress restriction during an aging process, a pressed face may affect electrolyte reflux and a lithiation rate, resulting in a shorter service life or lithium precipitation of the battery cell and affecting safety performance of the battery. Staggered arrangement can reduce uneven electrolyte reflux caused by stress concentration and reduce a risk of lithium plating.

Figure 2:
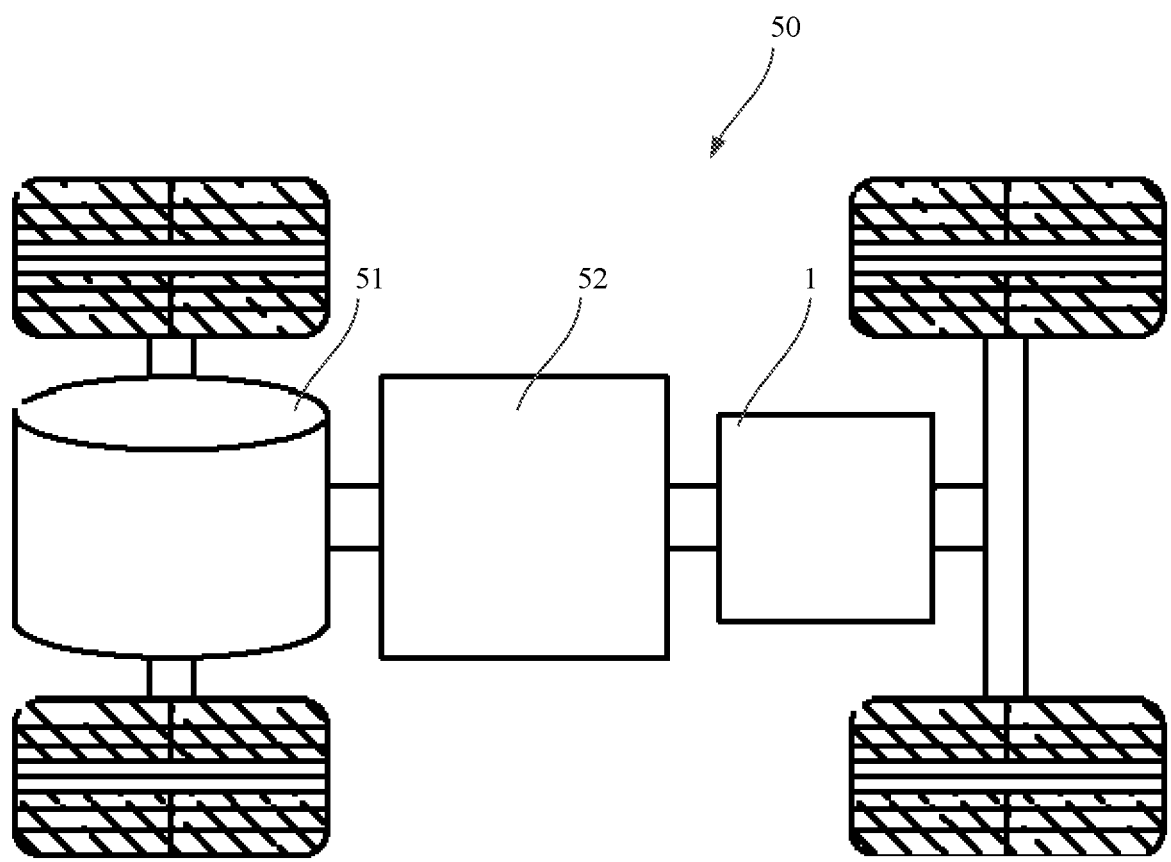
FIG. 2 is a schematic structural diagram of an apparatus using a battery according to an embodiment of this application.

FIG. 2 is a schematic structural diagram of an apparatus using a battery according to an embodiment of this application. Referring to FIG. 2, an embodiment of this application provides an apparatus using a battery 1. The apparatus may be a mobile device such as a vehicle, a ship and a small aircraft, or may be a non-mobile device capable of providing electric energy such as an energy storage cabinet. Using a vehicle as an example, the vehicle may be a new energy vehicle, and the new energy vehicle may be a battery electric vehicle, a hybrid electric vehicle, an extended range vehicle, or the like. The vehicle 50 may include a drive mechanism 51, a control mechanism 52, and a battery 1. The control mechanism 52 is electrically connected to the drive mechanism 51 for controlling start and stop of the drive mechanism 51 as required to drive or park the vehicle 50. The battery 1 is electrically connected to the control mechanism 52 for providing electric energy for the control mechanism 52. Power consuming components in the vehicle 50 may further include a sound device and the like.

Figure 3:
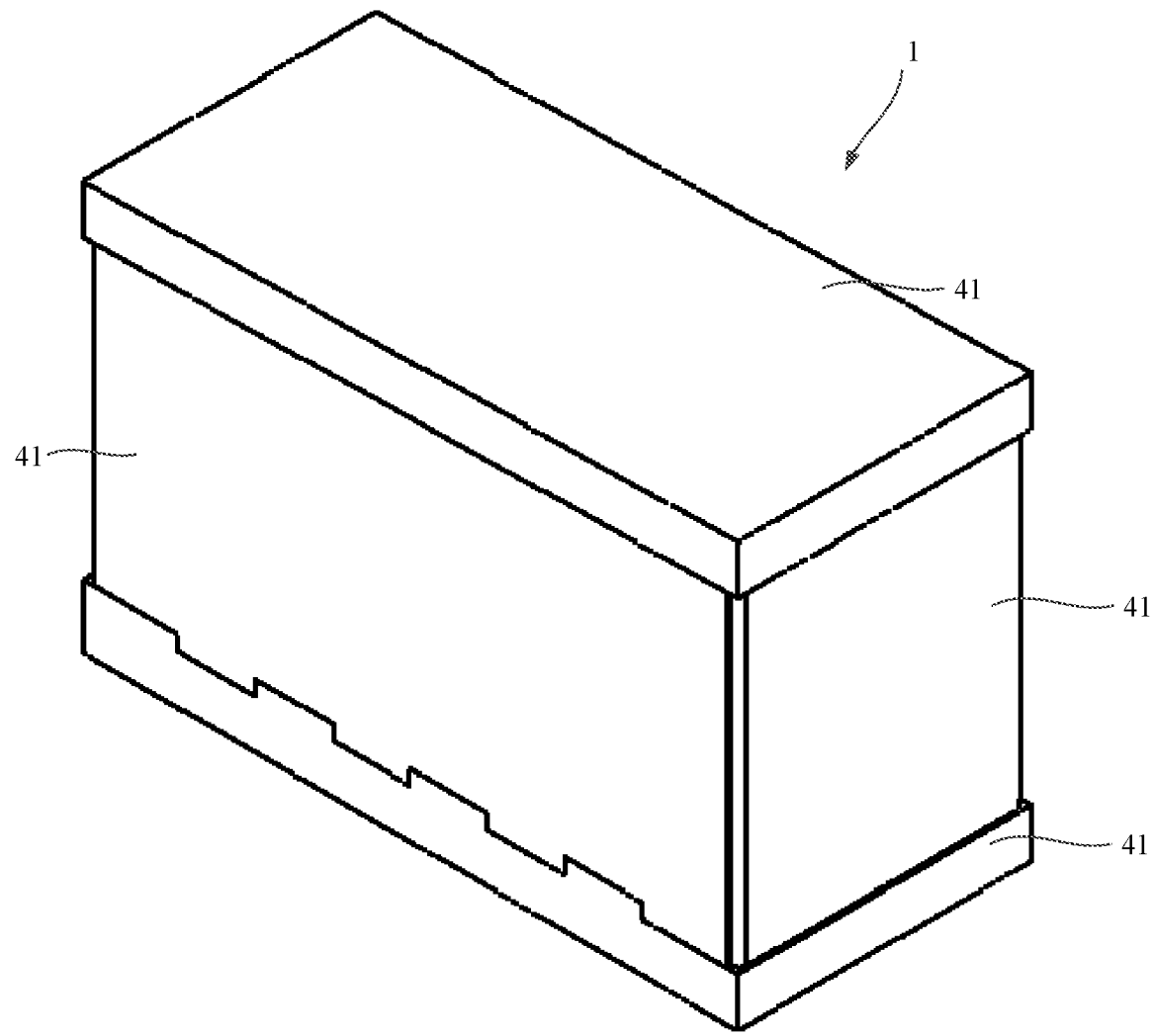
FIG. 3 is a first schematic structural diagram of a battery according to an embodiment of this application.
Figure 4:
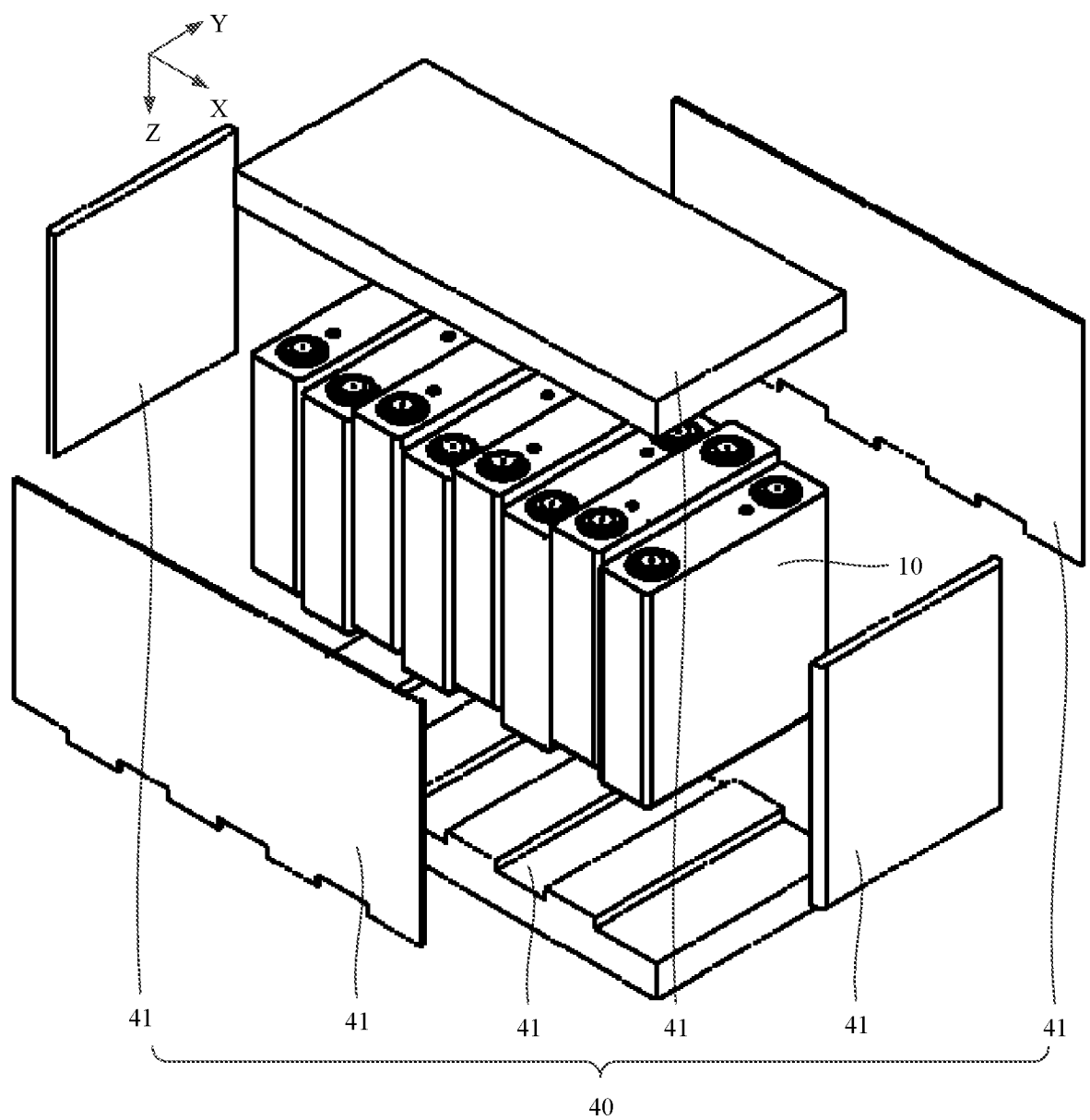
FIG. 4 is an exploded view of the battery shown in FIG. 3.
Figure 5:
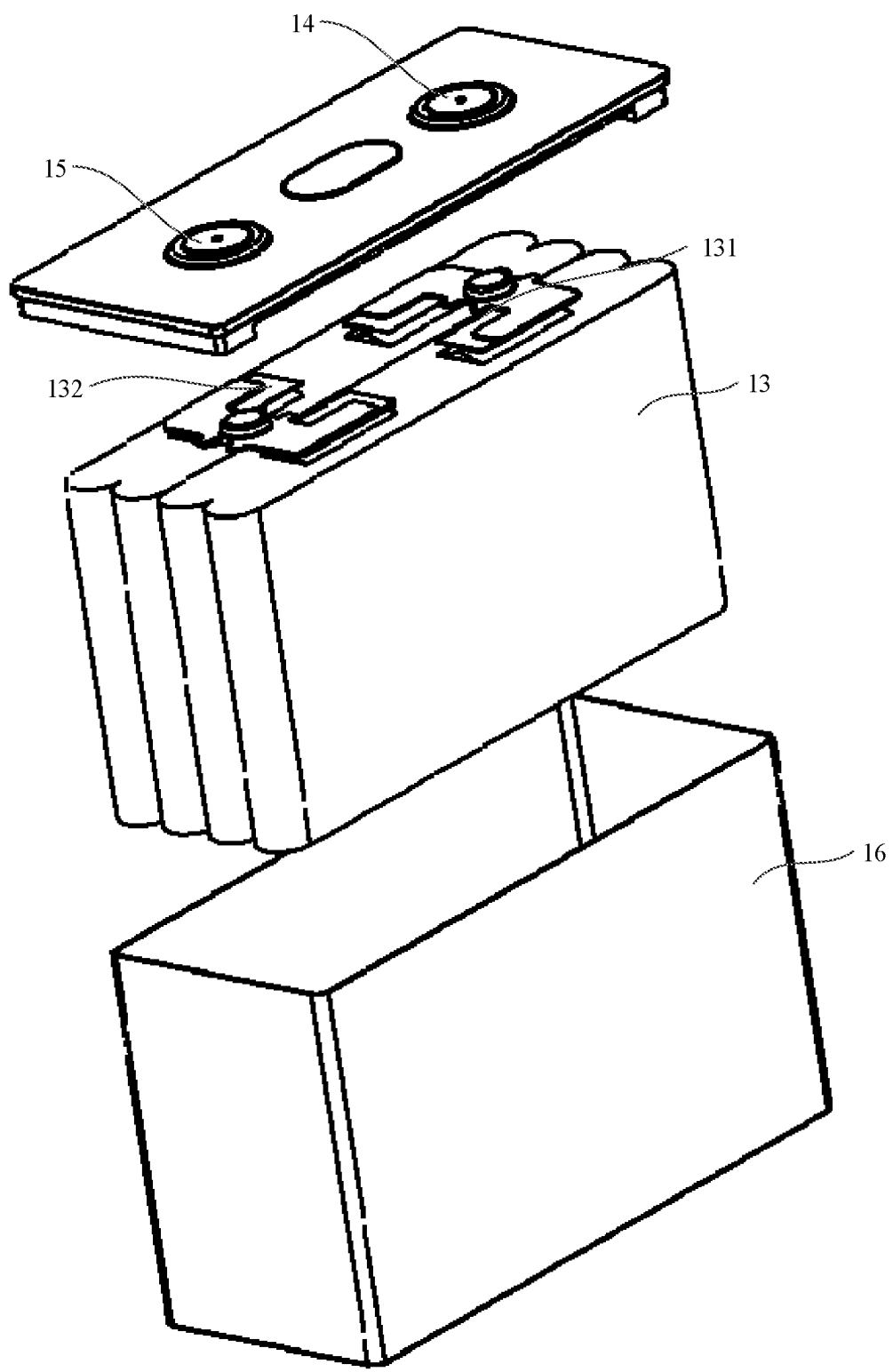
FIG. 5 is a schematic structural diagram of a battery cell in FIG. 4.
Figure 6:
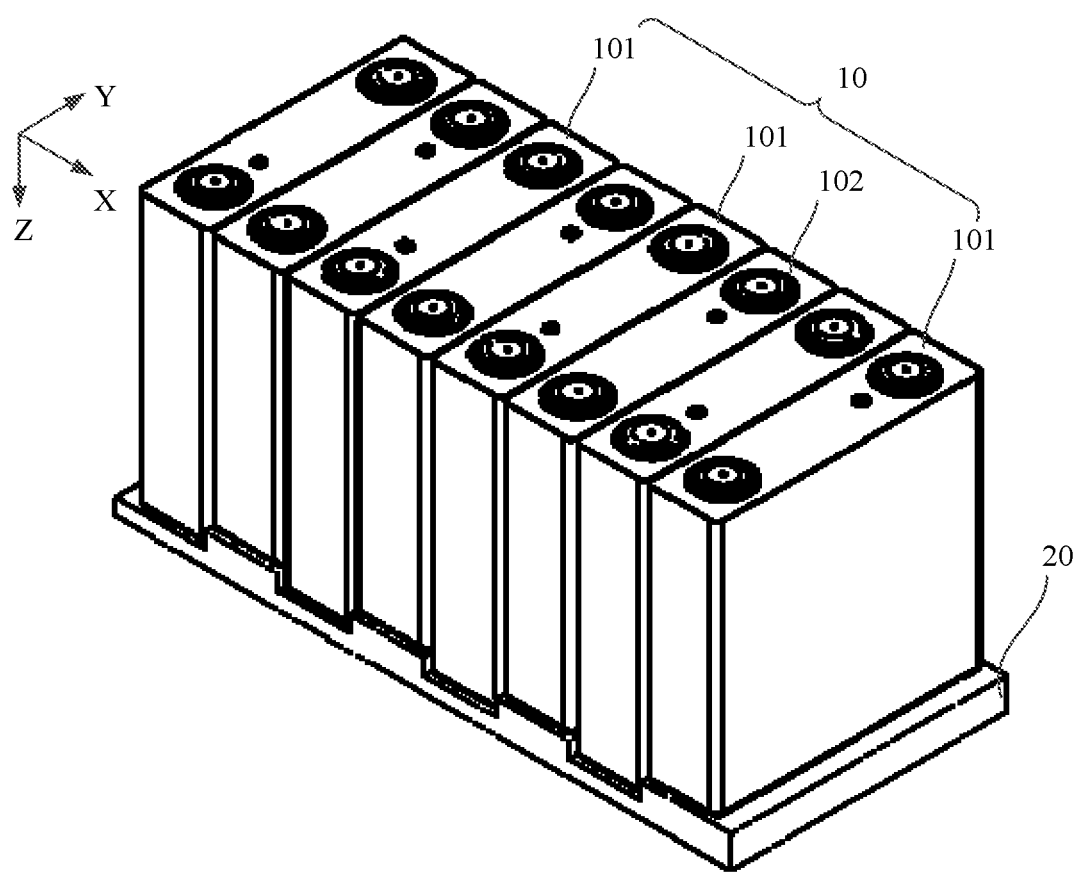
FIG. 6 is a first schematic structural diagram showing a plurality of battery cells and a support member according to an embodiment of this application.
Figure 7:
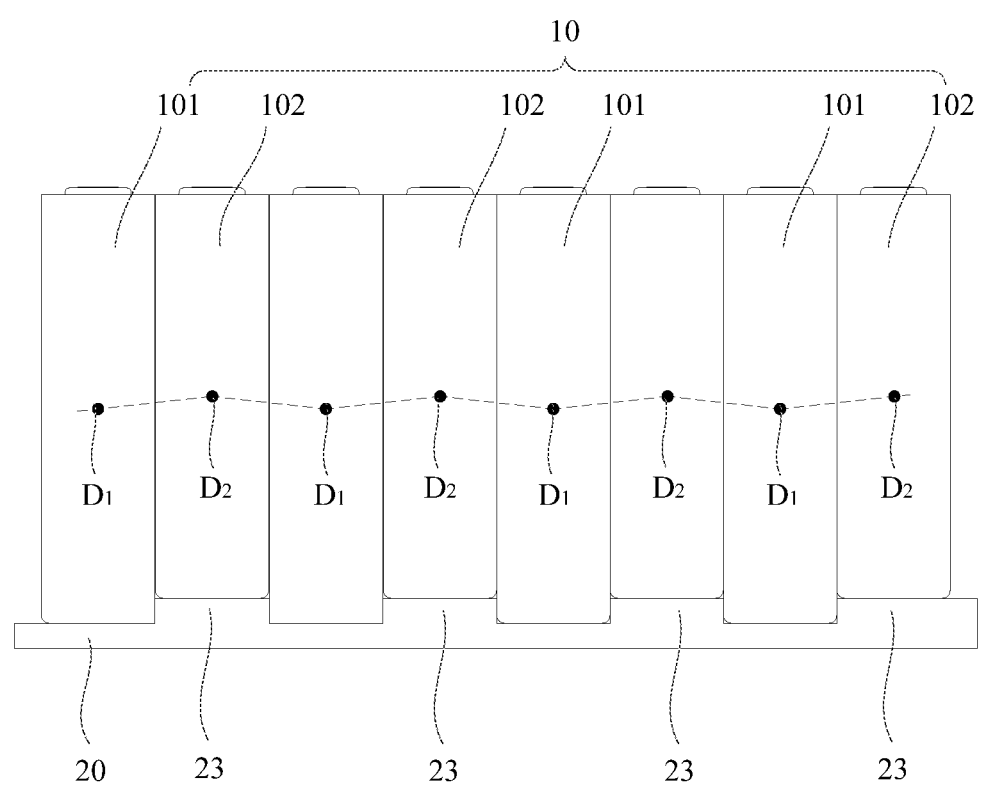
FIG. 7 is a schematic structural side view of the structure shown in FIG. 6.
Figure 8:
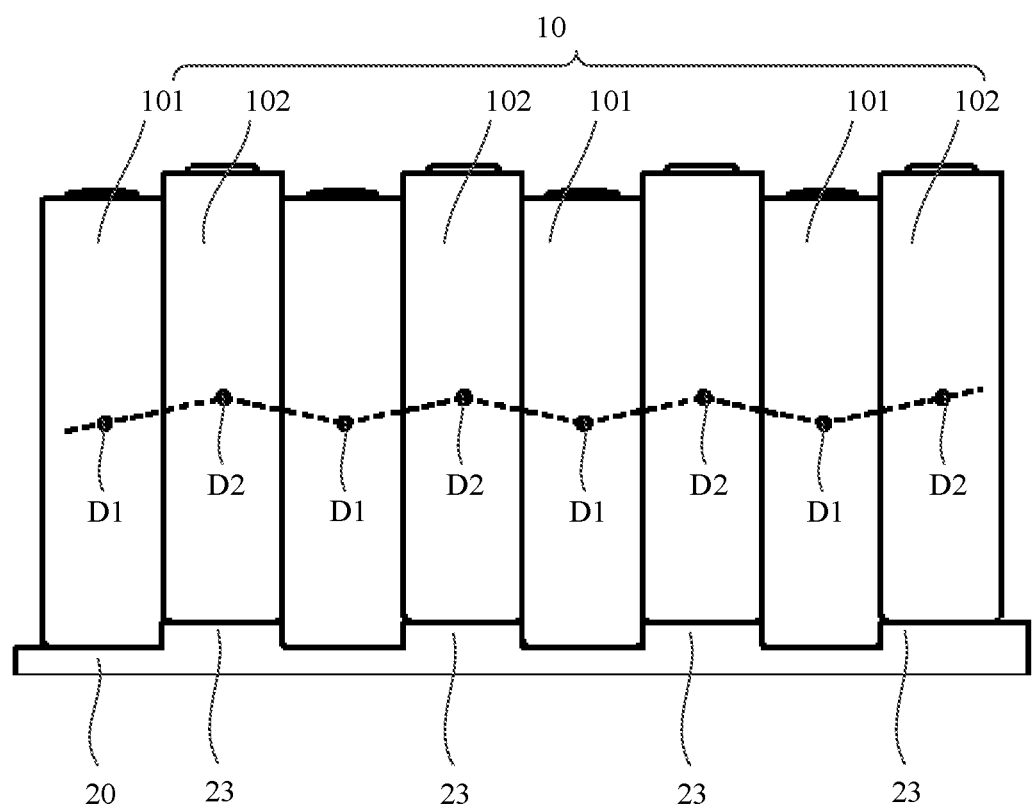
FIG. 8 is a second schematic structural diagram showing a plurality of battery cells and a support member according to an embodiment of this application.
Figure 9:
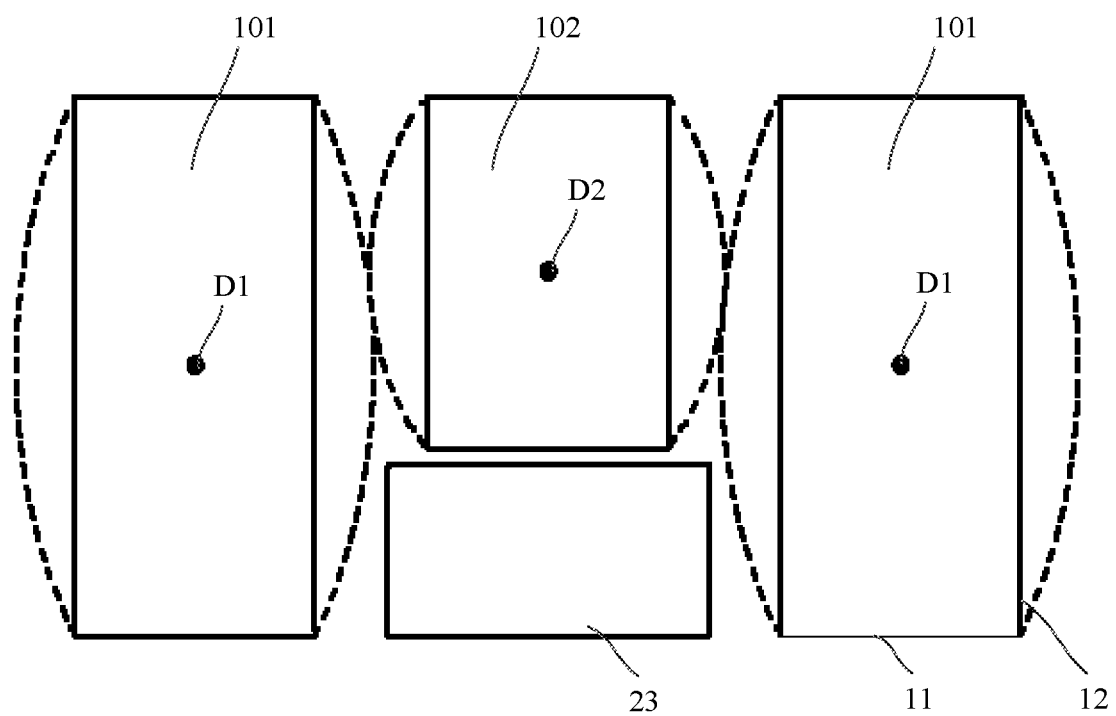
FIG. 9 is a schematic structural diagram showing a plurality of swelling battery cells in a battery according to an embodiment of this application.

FIG. 3 is a first schematic structural diagram of a battery according to an embodiment of this application. FIG. 4 is an exploded view of FIG. 3. FIG. 5 is a schematic structural diagram of a battery cell in FIG. 4. FIG. 6 is a first schematic structural diagram showing a plurality of battery cells and a support member according to an embodiment of this application. FIG. 7 is a schematic structural side view of FIG. 6. FIG. 8 is a second schematic structural diagram showing a plurality of battery cells and a support member according to an embodiment of this application. FIG. 9 is a schematic structural diagram showing a plurality of swelling battery cells in a battery according to an embodiment of this application.

Referring to FIG. 3 to FIG. 9, in some optional implementations, a battery 1 includes a plurality of battery cells 10; and a support member 20, where the support member 20 is configured to support the plurality of battery cells 10, a recess 21 is provided at the support member 20, and a part of battery cells 10 extend into and are supported in the recess 21. For example, one or more, but not all, of the battery cells 10 each extends into and is supported in a recess 21.

Specifically, referring to FIG. 3 to FIG. 5, the battery 1 includes a plurality of battery cells 10. The battery cell 10 may include a lithium ion secondary battery, a lithium ion primary battery, a lithium-sulfur battery, a sodium lithium-ion battery, a sodium ion battery, a magnesium ion battery, or the like. This is not limited in this embodiment of this application. The battery cell 10 may be of a cylindrical shape, a flat shape, a rectangular shape, or other shapes. This is not limited in this embodiment of this application. The battery cells 10 are typically divided into three types by packaging: cylinder cell, prismatic cell, and pouch cell. This is not limited in this embodiment of this application either.

Generally, the battery cell 10 includes an electrode assembly 13 and an electrolyte (not shown). The electrode assembly 13 includes a positive electrode plate, a negative electrode plate, and a separator disposed between the positive electrode plate and the negative electrode plate. Operation of the battery cell 10 relies on migration of metal ions between the positive electrode plate and the negative electrode plate. The positive electrode plate includes a positive electrode current collector and a positive electrode active material layer, the positive electrode active material layer is applied on a surface of the positive electrode current collector. A current collector uncoated with the positive electrode active material layer protrudes from a positive electrode current collector coated with the positive electrode active material layer, and the current collector uncoated with the positive electrode active material layer is used as a positive tab 131. Using a lithium ion battery as an example, the positive electrode current collector may be made of aluminum, and a positive electrode active substance may be lithium cobalt oxide, lithium iron phosphate, ternary lithium, lithium manganate oxide, or the like. The negative electrode plate includes a negative electrode current collector and a negative electrode active material layer, the negative electrode active material layer is applied on a surface of the negative electrode current collector. A current collector uncoated with the negative electrode active material layer protrudes from a negative electrode current collector coated with the negative electrode active material layer, and the current collector uncoated with the negative electrode active material layer is used as a negative tab 132. The negative electrode current collector may be made of copper, and the negative electrode active substance may be made of carbon, silicon, or the like. To allow a large current to pass through without fusing, a plurality of positive tabs 131 are stacked together, and a plurality of negative tabs 132 are stacked together. The separator may be made of polypropylene (PP for short), polyethylene (PE for short), or the like. In addition, the electrode assembly 13 may be in a winding structure or a laminated structure, and one or more electrode assemblies 13 may be provided, which is not specifically limited in this embodiment of this application.

The battery cell 10 further includes a housing 16, and the electrode assembly 13 and the electrolyte are all packaged in the housing 16. The housing 16 may be a hollow cuboid, square or cylinder, and the housing 16 may be made of aluminum, steel, or an alloy thereof, or may be made of a plastic material or an aluminum-plastic film. The housing 16 is further provided with a positive electrode terminal 14 and a negative electrode terminal 15. The positive tab 131 is electrically connected to the positive electrode terminal 14, and the negative tab 132 is electrically connected to the negative electrode terminal 15 to output electric energy.

As shown in FIG. 4 and FIG. 6, a plurality of battery cells 10 are arranged side by side in an arrangement direction X, and the battery also has a width direction Y and a height direction Z, where the arrangement direction X, the width direction Y, and the height direction Z are perpendicular to each other.

The plurality of battery cells 10 may be divided into a plurality of groups, each group of battery cells 10 is packaged to form a battery module, and a plurality of battery modules are packaged to form the foregoing battery 1. Optionally, the plurality of battery cells 10 may be directly packaged into the battery 1. A shape and a size of the battery 1 obtained after packaging are not limited in this embodiment, provided that the battery 1 is adapted to a space reserved for the battery 1 in the vehicle.

Referring to FIG. 4, a battery cell 10 is a prismatic cell. A plurality of prismatic cells may be directly packaged by using a protective box 40, to form a prismatic battery 1. In this case, the protective box 40 includes six side plates 41, and the six side plates 41 are connected and surround on the outer side of the plurality of battery cells 10. The protective box 40 may be made of metal, plastic, or the like.

It can be understood that a thickness direction of the battery cells 10 is the arrangement direction X, and a side surface of the battery cells 10 in the thickness direction is a largest side of the battery cells 10 in the arrangement direction X. When the battery cell 10 swells and deforms, central portions of two largest sides of the battery cell 10 protrude toward both sides, respectively, and the central portions closer to the largest sides have larger protruding portion.

In order to reduce accumulative swelling of the battery 1 in the arrangement direction X, a position of any battery cell 10 with the largest swelling deformation is staggered with respect to other battery cells 10 in a direction (also referred to as a "staggering direction," such as a width direction Y or a height direction Z) perpendicular to the arrangement direction X. Then, the battery cell 10 protrudes with respect to the other battery cells 10 in the staggering direction.

Correspondingly, referring to FIG. 7 to FIG. 11, the battery 1 provided in this embodiment of this application has a support member 20, where a recess 21 is provided at the support member 20. The protruding battery cell 10 may extend into and be supported in the recess 21, and the other battery cells 10 may be directly supported by the support member 20.

For ease of description, a part of the battery cells 10 located in the recess 21 may be referred to as a first battery cell 101, and another part of the battery cells 10 directly supported by the support member 20 may be referred to as a second battery cell 102.

Then, the first battery cell 101 is located in the recess 21, the second battery cell 102 is directly supported by the support member 20, central portions of largest sides of the first battery cell 101 and the second battery cell 102 are staggered along a direction perpendicular to the arrangement direction X. The central portions of the largest sides of the first battery cell 101 and the second battery cell 102 are not distributed on the same straight line, or a connecting line of the central portions of the largest sides of the first battery cell 101 and the second battery cell 102 is at an angle with the arrangement direction X, which reduces accumulative swelling deformation of the plurality of battery cells 10 in the arrangement direction X, and reduces the degree of pressing between the plurality of battery cells 10 in the arrangement direction X, achieving a relatively high safety performance for the battery 1.

Certainly, the type of the battery cell 10 is not limited in this embodiment, and the battery cells 10 may be of the same type. The term "same" herein may mean that the first battery cell 101 and the second battery cell 102 are substantially identical in chemical system, shape, size, volume, mass, energy density, or the like. The types of the battery cells 10 may be different. The term "different" herein means that there is a significant difference in at least one of chemical system, shape, size, volume, mass, energy density, or the like.

In some optional implementations, the first battery cell 101 may be a ternary-lithium battery cell, specifically for example, a lithium nickel cobalt manganate ($LiNiMnCoO_2$, NCM) battery cell or a lithium nickel cobalt aluminate ($LiNiCoAlO_2$, NCA) battery cell, and the second battery cell 102 may be a lithium iron phosphate ($LiFePO_4$, LFP) battery cell or a lithium cobalt oxide ($LiCoO_2$) battery cell.

In some optional implementations, the battery cell 10 includes a bottom wall 11 and a side wall 12, the side wall 12 is connected to the bottom wall 11, and the recess 21 is attached to the bottom wall 11 and the side wall 12 of the battery cell 10 to support the battery cells 10. The side wall 12 is a largest side of the battery cell 10, where the largest side of the battery cell 10 is a surface with a largest area among outer surfaces of the battery cell 10.

In this way, the first battery cell 101 has an insertion end, and a bottom wall 11 of the insertion end of the first battery cell 101 comes in contact with a bottom wall surface of the recess 21. Two opposite side wall surfaces of the recess 21 press against the insertion end of the first battery cell 101, and an inner wall surface of the recess 21 limits the insertion end of the first battery cell 101. Even if the first battery cell 101 is pressed by the second battery cell 102, only part of the first battery cell 101 extending out of the recess 21 is displaced, and the insertion end of the first battery cell 101 is still clamped to the recess 21, meaning that the first battery cell 101 is well fastened. The battery 1 as a whole features good stability.

The bottom wall 11 may be a side wall of the battery cell 10 in a width direction Y, a side wall in a height direction Z, or side walls in both the width direction Y and the height direction Z. In addition, the support member 20 may be a side plate 41 of a protective box 40 in the width direction Y, a side plate 41 in the height direction Z, or side plates 41 in both the width direction Y and the height direction Z.

In some optional implementations, the number of first battery cells 101 and the number of second battery cells 102 are not limited in this embodiment. For example, there are one first battery cell 101 and one second battery cell 102, or there are one first battery cell 101 and a plurality of second battery cells 102. Certainly, the first battery cell 101 and the second battery cell 102 may alternatively be provided in plurality. That is, centers of at least two battery cells 10 in the plurality of battery cells 10 are staggered.

To be specific, the plurality of battery cells 10 include at least one first battery cell 101 and one second battery cell 102, and central portions of largest sides of the first battery cell 101 and the second battery cell 102 are staggered. In this way, after the plurality of battery cells 10 are arranged side by side along the arrangement direction X, the central portions of the largest sides of the at least two battery cells 10 are staggered along a direction perpendicular to the arrangement direction X, so that accumulative swelling of the battery 1 in the arrangement direction X becomes smaller, implementing higher safety performance of the battery 1.

It can be understood that when the first battery cell 101 and the second battery cell 102 are both provided in plurality, the first battery cell 101 and the second battery cell 102 may be arranged alternately in a manner of n first battery cells 101 and m second battery cells 102, where n≥1, m≥1, and n and m are both integers. For example, the arrangement manner may be: three first battery cells 101, two second battery cells 102, and four first battery cells 101 are sequentially arranged.

In this case, depending on the number of first battery cells 101, one or more recesses 21 may be provided at the support member 20. To be specific, when the support member 20 is provided with one recess 21, a plurality of first battery cells 101 may be provided in the recess 21. When a plurality of recesses 21 are provided at the support member 20, one or more first battery cells 101 may be provided in each recess 21. This is not limited in this embodiment. Certainly, when a plurality of recesses 21 are provided at the support member 20, recess depths of the recesses 21 may be the same or different.

In order to reduce the accumulative swelling of the battery 1 in the arrangement direction X, central portions of largest sides of any two adjacent battery cells 10 in this embodiment may be staggered, so that the swelling deformation of any two adjacent battery cells 10 in the arrangement direction X can be reduced.

In this case, whether two adjacent two battery cells 10 are two adjacent first battery cells 101, two adjacent second battery cells 102, or one first battery cell 101 and one second battery cell 102 that are adjacent, central portions of largest sides of the two adjacent battery cells 10 may be staggered.

For example, the first battery cells 101 and the second battery cells 102 are sequentially disposed adjacent to each other, and a center $D_1$ of the first battery cell and a center $D_2$ of the second battery cell are staggered in the height direction Z (as shown in FIG. 7 and FIG. 8). In this case, both sides of the first battery cell 101 are provided with one second battery cell 102, and both sides of the second battery cell 102 are provided with one first battery cell 101. This facilitates assembly and a shape of the battery 1 obtained after packaging is more regular. Each first battery cell 101 is accommodated in the recess 21, and the support member 20 forms a concave-convex supporting surface.

The center $D_1$ of the first battery cell 101 is flush with the central portion of the largest side of the first battery cell 101, and the center $D_2$ of the second battery cell 102 is flush with the central portion of the largest side of the second battery cell 102. Therefore, central portions of largest sides of any adjacent first battery cell 101 and second battery cell 102 are staggered, swelling deformation of any adjacent first battery cell 101 and second battery cell 102 becomes smaller, and accumulative swelling deformation of the battery 1 in the arrangement direction X becomes smaller, implementing higher safety performance of the battery 1.

In this case, because of different sizes of the first battery cell 101 and the second battery cell 102, top ends of the first battery cell 101 and the second battery cell 102 in the height direction Z may be staggered while bottom ends of the first battery cell 101 and the second battery cell 102 in the height direction Z are flush (not shown); or the bottom ends of the first battery cell 101 and the second battery cell 102 in the height direction Z are staggered while the top ends of the first battery cell 101 and the second battery cell 102 in the height direction Z (as shown in FIG. 7) are flush; or both the top ends and the bottom ends of the first battery cell 101 and the second battery cell 102 in the height direction Z are staggered (as shown in FIG. 8).

Figure 10:
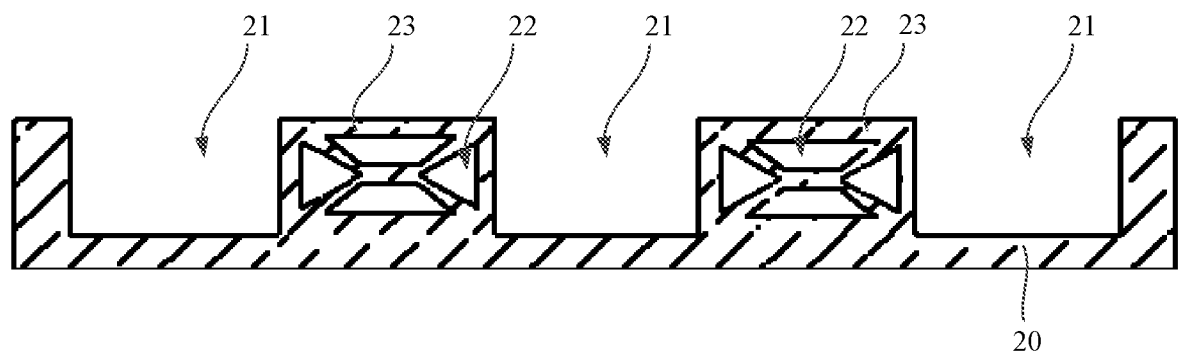
FIG. 10 is a first schematic structural diagram of a support member according to an embodiment of this application.
Figure 11:
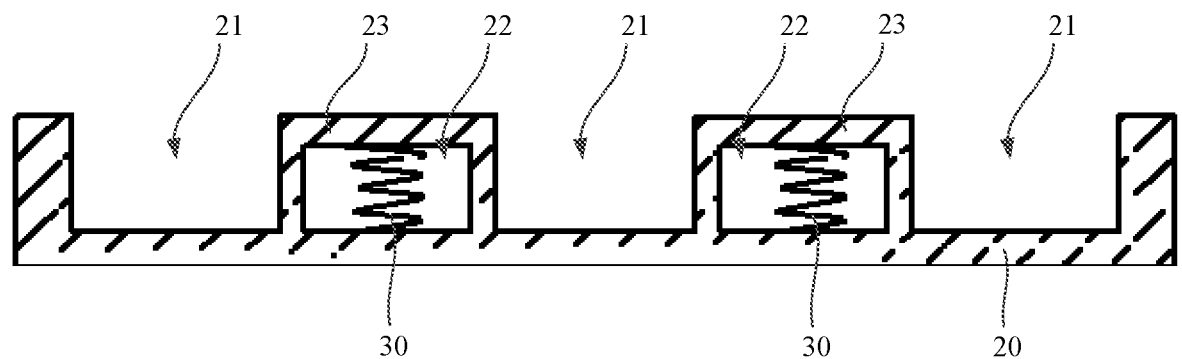
FIG. 11 is a second schematic structural diagram of a support member according to an embodiment of this application.

FIG. 10 is a first schematic structural diagram of a support member according to an embodiment of this application. FIG. 11 is a second schematic structural diagram of a support member according to an embodiment of this application. Referring to FIG. 10 and FIG. 11, in some optional implementations, the support member 20 has a hollow cavity 22. In this case, a weight of the support member 20 is relatively small, and manufacturing costs of the support member 20 and the battery 1 are relatively low.

The hollow cavity 22 may include a plurality of cavities (as shown in FIG. 11), or may include only one cavity (as shown in FIG. 10).

Referring to FIG. 10, a plurality of connecting structures is provided in the hollow cavity 22. The connecting structures are connected to an inner wall surface of the hollow cavity 22, so that the hollow cavity 22 does not excessively reduce a support strength of the support member 20.

An extended length of the hollow cavity 22 in the arrangement direction X may be the same as a size of a plurality of battery cells 10 in the arrangement direction X.

Alternatively, the hollow cavity 22 may be provided in plurality and spaced apart in the arrangement direction X. For example, the hollow cavities 22 are in one-to-one correspondence to the battery cells 10. In this way, a partition between two adjacent hollow cavities 22 may form a support to avoid an excessively small support strength of the support member 20. Optionally, the number of the hollow cavities 22 may be less than that of the battery cells 10, so as to avoid excessively reducing the strength of the support member 20 by the hollow cavities 22.

In some optional implementations, the support member 20 is provided with a recess 21, and correspondingly, a protruding portion 23 is formed at the support member 20. For example, the protruding portion 23 may be formed between two adjacent recesses 21. The second battery cell 102 may be supported by the protruding portion 23, and in this case, the hollow cavity 22 may be formed in the protruding portion 23.

In some optional implementations, the support member 20 is provided with an elastic member 30, and the elastic member 30 is connected to the support member 20 to support the battery cells 10. In this way, the shock absorption and impact resistance capabilities of the battery cell 10 and the battery can be improved. The elastic member 30 may be a spring, elastic rubber, or the like, which is not limited in this embodiment.

Each battery cell 10 may be correspondingly provided with one elastic member 30, so as to cushion the battery cell 10.

In order to fasten the elastic member 30, in some optional implementations, an accommodating groove is provided at the support member 20, and the elastic member 30 is disposed in the accommodating groove. In this way, when the battery 1 suffers impact and the battery cell 10 is displaced relative to the support member 20, the elastic member 30 may elastically deform in the accommodating groove. In this case, the accommodating groove may play a guiding role to prevent the elastic member 30 from tilting in the process of deformation, so as to prevent the battery cell 10 from tilting.

The number of the accommodating grooves may be less than the number of the battery cells 10, so as to prevent strength of the support member 20 from being weakened by excessive accommodating grooves.

In some optional implementations, the accommodating groove may be formed in the protruding portion 23, in which case the hollow cavity 22 may constitute the accommodating groove and the elastic member 30 is accommodated in the hollow cavity 22. The protruding portion 23 may have a thin-walled elastic shell structure, so as to alleviate the shock to the second battery cell 102 through the protruding portion 23 and elastic deformation of the elastic member 30 when the second battery cell 102 is supported by the protruding portion 23.

The protruding portion 23 may be bonded to the support member 20 or integrally formed with the support member 20 (as shown in FIG. 7 and FIG. 8). In this case, the support member 20 may be a plate structure, the protruding portion 23 is connected to the support member 20, and the protruding portion 23 and the support member 20 form a concave-convex supporting surface, implementing a high support strength of the support member 20. An outer side surface of the support member 20 is a complete plane, so as to facilitate assembly of the battery 1 with the apparatus.

In some optional implementations, a flow channel is provided at the support member 20. The flow channel is configured to accommodate fluid to regulate temperature of a plurality of cells 10.

The flow channel may be a serpentine flow channel, a parallel flow channel, or other flow channel structures known to those skilled in the art. In this way, the flow channel has a relatively large length, and the fluid can fully exchange heat with the battery cells 10 during circulation in the flow channel. The fluid may be a gas or a liquid. For example, the fluid may be water or air.

The support member 20 may be a thermally conductive material such as iron or aluminum. As such, when the battery is working, heat generated from the battery cells 10 can be transferred to the fluid in the support member 20 through the support member 20 in time, so that the temperature of the fluid increases and the temperature of the battery cells 10 decreases, thereby cooling the battery cells 10. In other words, the support member 20 can regulate the temperature of each battery cell 10 while protecting the plurality of battery cells 10, so that each battery cell 10 can operate normally.

The support member 20 is plate-shaped and is attached to a side wall of each battery cell 10, so that a heat exchange area between the support member 20 and each battery cell 10 is relatively large, thereby achieving a better heat dissipation effect for the battery cell 10.

The support member 20 is provided with the recess 21, and a side surface of the support member 20 facing the plurality of battery cells 10 is a concave-convex supporting surface. In this case, the flow channel can be distributed along the concave-convex supporting surface.

In this case, the first battery cell 101 extends into the recess 21, and the bottom wall and the side wall of the first battery cell 101 separately exchange heat with an inner wall surface of the recess 21. The second battery cell 102 is supported by the protruding portion 23, and only a bottom wall of the second battery cell 102 exchanges heat with the protruding portion 23. Therefore, the heat exchange area between the first battery cell 101 and the support member 20 is greater than the heat exchange area between the second battery cell 102 and the support member 20, and the heat dissipation effect of the first battery cell 101 is better than that of the second battery cell 102. Therefore, the battery cell 10 that generates more heat or dissipates less heat can be used as the first battery cell 101 and accommodated in the recess 21, and the battery cell 10 that generates less heat or dissipates more heat can be used as the second battery cell 102 and directly supported by the protruding portion 23.

In some optional implementations, the flow channel may include a first flow channel and a second flow channel, where the first flow channel and the second flow channel are isolated from each other, and the fluid separately flows in the first flow channel and the second flow channel. In this case, the fluid flowing in the first flow channel does not exchange heat with the second battery cell 102, and exchanges heat only with the first battery cell 101; the fluid flowing in the second flow channel does not exchange heat with the first battery cell 101, and exchanges heat only with the second battery cell 102. In this way, efficiency of heat exchange between the fluid and each battery cell 10 is relatively high, achieving a better temperature regulation effect for the battery cell 10.

The first flow channel and the second flow channel are isolated from each other. Compared with the implementation in which a plurality of battery cells 10 correspond to one flow channel, the lengths of the first flow channel and the second flow channel in this embodiment are both smaller, so that the fluid after heat exchange can be discharged in time, avoiding that part of the battery cells 10 at an outlet of the flow channel cannot transfer heat sufficiently due to excessive heat absorbed by the fluid along the excessively long flow channel.

Considering different costs for fluids of different thermal conductivities, in some optional implementations, the fluid includes a first fluid and a second fluid, where the first fluid flows in a first flow channel, the second fluid flows in a second flow channel, and a thermal conductivity of the first fluid is greater than a thermal conductivity of the second fluid.

In this case, the first fluid with a larger thermal conductivity corresponds to the first battery cell 101 with more heat generation or slower heat dissipation and flows in the first flow channel, and the first fluid exchanges more heat with the first battery cell 101 at a faster speed. The second fluid with a smaller thermal conductivity corresponds to the second battery cell 102 with less heat generation or faster heat dissipation and flows in the second flow channel, and less heat is exchanged between the second fluid and the second battery cell 102.

In other words, this embodiment uses different fluids for different battery cells 10, to implement relatively uniform temperature between the battery cells 10 and reduce costs.

An embodiment of this application further provides a preparation method of battery. The method is used to prepare the foregoing battery 1 and includes the following steps.

S100. Provide a plurality of battery cells 10, and dispose the plurality of battery cells 10 side by side in an arrangement direction X. In this case, largest sides of all battery cells 10 are arranged in parallel.

S200. Provide a support member 20, and form a recess 21 on the support member 20.

The support member 20 constitutes a side plate 41 of part of a protective box 40. For example, the support member 20 may be disposed at a side of the battery cell 10 in a width direction Y or a side of the battery cell 10 in a height direction Z.

S300. Support the plurality of battery cells 10 on the support member 20, and support a part of the plurality of battery cells 10 in the recess 21.

In the process of assembling the battery, all the battery cells 10 are supported by the support member 20. A part of the battery cells 10 extend into and are supported in the recess 21, and the rest battery cells 10 are directly supported by the support member 20. In this way, centers of the two parts of battery cells 10 are staggered.

When the battery 1 is working, most swelling portions of the two parts of battery cells 10 are staggered, thereby reducing the extrusion of the two adjacent battery cells 10 in the battery 1, reducing deformation of the battery 1, and implementing higher safety performance of the battery 1.

An embodiment of this application further provides a preparation device of battery. The device is configured to prepare the battery 1, and includes: a battery cell preparation module, configured to prepare the plurality of battery cells 10; a support member preparation module, configured to prepare the support member 20 and form a recess 21 on the support member 20; and an assembling module, configured to support the plurality of battery cells 10 on the support member 20, and support a part of the battery cells 10 in the recess 21.

The battery cell preparation module, the support member preparation module, and the assembling module may be independent from each other or may be parts of the preparation device, which is not limited in this embodiment.

Specifically, during battery preparation, each battery cell 10 and the support member 20 are prepared first, and the recess 21 is formed at the support member 20. During or before the process of assembling the battery, each battery cell 10 may be arranged side by side, so that the assembling module can attach the plurality of the battery cells 10 arranged side by side to the support member 20. In this case, part of the battery cells 10 extend into the recess 21 and part of the battery cells 10 are directly supported by the support member 20 such that centers of the two parts of battery cells 10 are staggered.

Although this application has been described with reference to some embodiments, various modifications can be made to this application without departing from the scope of this application and the components therein can be replaced with equivalents. In particular, in absence of structural conflicts, the technical features mentioned in the embodiments can be combined in any manner. This application is not limited to the specific embodiments disclosed in this specification, but includes all technical solutions falling within the scope of the claims.

What is claimed is:

1. A battery comprising:
a plurality of battery cells; and
a support member configured to support the plurality of battery cells and including a recess and a protruding portion next to the recess, a top surface of the recess being lower than a top surface of the protruding portion;
wherein:
a bottom of one battery cell of the plurality of battery cells extends into the recess and is supported by and in contact with the top surface of the recess, and a bottom of another one battery cell of the plurality of battery cells is supported by and in contact with the top surface of the protruding portion; and
the protruding portion has a hollow cavity, and an elastic member is accommodated in the hollow cavity of the protruding portion to support the another one battery cell of the plurality of battery cells.

2. The battery according to claim 1, wherein:
the one battery cell comprises a bottom wall and a side wall connected to the bottom wall; and
the recess is attached to the bottom wall and the side wall of the one battery cell to support the one battery cell.

3. The battery according to claim 1, wherein centers of at least two of the battery cells are staggered with respect to each other.

4. The battery according to claim 1, wherein a flow channel is provided at the support member, and the flow channel is configured to accommodate fluid to regulate temperature of the plurality of battery cells.

5. An apparatus comprising the battery according to claim 1, wherein the battery provides electric energy for the apparatus.

6. A battery preparation method for preparing the battery according to claim 1, comprising: providing the plurality of battery cells; providing the support member, and forming the recess and the protruding portion next to the recess in the support member; and
supporting the plurality of battery cells on the support member.

7. The method according to claim 6, wherein: the one battery cell comprises a bottom wall and a side wall connected to the bottom wall; and the recess is attached to the bottom wall and the side wall of the one battery cell to support the one battery cell.

8. The method according to claim 6, wherein supporting the battery cells on the support member includes staggering centers of at least two of the battery cells with respect to each other.

9. The method according to claim 6, further comprising: connecting the elastic member to the support member to support the battery cells.

10. The method according to claim 9, wherein: connecting the elastic member to the support member includes disposing the elastic member in the hollow cavity.

11. The method according to claim 6, wherein a flow channel is provided at the support member, and the flow channel is configured to accommodate fluid to regulate temperature of the plurality of battery cells.

12. The battery according to claim 1, wherein centers of at least two of the plurality of battery cells are staggered with respect to each other along a height direction of the plurality of battery cells.

13. The battery according to claim 1, wherein a top end of the one battery cell of the plurality of battery cells is coplanar with a top end of the another one battery cell of the plurality of battery cells.

* * * * *